United States Patent
Faeth et al.

(10) Patent No.: US 11,232,237 B2
(45) Date of Patent: Jan. 25, 2022

(54) SYSTEM AND METHOD FOR PERCEPTION-BASED SELECTION OF FEATURES IN A GEOMETRIC MODEL OF A PART

(71) Applicant: Siemens Industry Software Inc., Plano, TX (US)

(72) Inventors: Adam Faeth, Ames, IA (US); Sashank Ganti, Waukee, IA (US)

(73) Assignee: Siemens Industry Software Inc., Plano, TX (US)

( * ) Notice: Subject to any disclaimer, the term of this patent is extended or adjusted under 35 U.S.C. 154(b) by 456 days.

(21) Appl. No.: 16/309,328

(22) PCT Filed: Jul. 28, 2016

(86) PCT No.: PCT/US2016/044377
§ 371 (c)(1),
(2) Date: Dec. 12, 2018

(87) PCT Pub. No.: WO2018/022053
PCT Pub. Date: Feb. 1, 2018

(65) Prior Publication Data
US 2019/0318046 A1    Oct. 17, 2019

(51) Int. Cl.
*G06F 30/00* (2020.01)
*G06F 119/18* (2020.01)

(52) U.S. Cl.
CPC .......... *G06F 30/00* (2020.01); *G06F 2119/18* (2020.01)

(58) Field of Classification Search
USPC ........................................................... 703/1
See application file for complete search history.

(56) References Cited

U.S. PATENT DOCUMENTS 5,757,358 A * 5/1998 Osga ................... G06F 3/04842
345/157
6,204,849 B1   3/2001 Smith
(Continued)

FOREIGN PATENT DOCUMENTS

EP   2891998 A1   7/2015

OTHER PUBLICATIONS

Abaqus-CAE-2006 (Abaqus CAE user manual downloaded from 94.167.201.93/English/SIMACAECAERefMap/simacae-m-PicHelptopics-sb.htm dated Jun. 6, 2006) (Year: 2006).*

(Continued)

*Primary Examiner* — Brian S Cook

(57) ABSTRACT

A system may cause a display device to display a graphical representation of a geometric model of a part having a plurality of features that are individually selectable in a work space of a graphical user interface and may receive a selection input representative of a command to select one or more features of the geometric model. The system may also determine at least one displayed characteristic capable of being visually perceived by a user that the geometric model or a portion thereof has with respect to the workspace in terms of size, orientation, and/or position. Also, the system may carry out a first selection from among either a coarser selection of the features or a finer selection of the features of the geometric model based on an input location and based on the determined at least one displayed characteristic of the geometric model or portion thereof.

15 Claims, 7 Drawing Sheets

(56) References Cited

U.S. PATENT DOCUMENTS

| | | | |
|---|---|---|---|
| 7,689,936 B2 | 3/2010 | Rosel | |
| 7,911,481 B1 | 3/2011 | Ballagh et al. | |
| 8,675,014 B1* | 3/2014 | Milne | G06F 3/04842 |
| | | | 345/629 |
| 2012/0290958 A1 | 11/2012 | Letzelter et al. | |
| 2014/0074272 A1 | 3/2014 | Cowden | |
| 2015/0213187 A1 | 7/2015 | Goyal et al. | |

OTHER PUBLICATIONS

Cashion; "Intelligent Selection Techniques for Virtual Environments"; Diss. University of Central Florida Orlando; Florida; 2014, pp. 1-199.

Argelaguet et al.; "A Survey of 3D Object Selection Techniques for Virtual Environments", Computers & Graphics; 2012; Retrieved from http://dx.doi.org/10.1016/j.cag.2012.12.003, pp. 121-136.

Ortega; "Hook: Heuristics for Selecting 3D Moving Objects in Dense Target Environments"; 3D User Interfaces (3DUI); 2013; IEEE Symposium, pp. 1-5.

Yu; "Active 3D Surface Modeling Using Perception-Based, Differential-Geometric Primitives"; Diss. University of Wisconsin-Madison; 1999, pp. 1-218.

Akoumianakis et al., "Encapsulating Intelligent Interactive Behaviour in Unified User Interface Artefacts", Interacting With Computers, vol. 12, No. 4, Feb. 1, 2000, pp. 383-408.

Anonymous, "SolidWorks Education Edition Getting Started", Internet Citation, Jul. 11, 2004, Retrieved from the Internet: URL:http://web.archive.org/web/20040711181750/http://engr.atu.edu/GettingStarted.pdf [retrieved on Feb. 21, 2006], pp. 1-280.

PCT International Search Report and Written Opinion of International Searching Authority dated Apr. 3, 2017 corresponding to PCT International Application No. PCT/US2016/044377 filed Jul. 28, 2016.

* cited by examiner

SYSTEM AND METHOD FOR
PERCEPTION-BASED SELECTION OF
FEATURES IN A GEOMETRIC MODEL OF A
PART

TECHNICAL FIELD

The present disclosure is directed, in general, to computer-aided design (CAD), computer-aided manufacturing (CAM), computer-aided engineering (CAE), visualization, simulation, and manufacturing systems, product data management (PDM) systems, product lifecycle management (PLM) systems, and similar systems, that are used to create, use, and manage data for products and other items (collectively referred to herein as product systems).

BACKGROUND

Product systems may be used to carry out creating, editing, analyzing, or annotating geometric models of manufactured parts. Such product systems may benefit from improvements.

SUMMARY

Variously disclosed embodiments include data processing systems and methods that may be used to facilitate perception-based selection of features in a geometric model of a part. In one example, a system may comprise at least one processor configured to cause a display device to display a graphical representation of a geometric model of a part having a plurality of features that are individually selectable in a work space of a graphical user interface. In addition, the at least one processor may be configured to receive a selection input through an input device representative of a command to select one or more features of the geometric model, which selection input specifies an input location on the workspace that coincides with a location on the geometric model. Further, the at least one processor may be configured to determine at least one displayed characteristic capable of being visually perceived by a user that the geometric model or a portion thereof has with respect to the workspace. In addition, the at least one processor may be configured to carrying out a first selection from among either a coarser selection of the features or a finer selection of the features of the geometric model based on the input location and based on the determined at least one displayed characteristic of the geometric model or portion thereof, wherein the coarser selection includes a selection of more features of the geometric model than the finer selection, wherein the coarser selection includes the features of the finer selection.

In another example, a method for perception-based selection of features in a geometric model of a part may comprise through operation of at least one processor: causing a display device to display a graphical representation of a geometric model of a part having a plurality of features that are individually selectable in a work space of a graphical user interface; receiving a selection input through an input device representative of a command to select one or more features of the geometric model, which selection input specifies an input location on the workspace that coincides with a location on the geometric model; determining at least one displayed characteristic capable of being visually perceived by a user that the geometric model or a portion thereof has with respect to the workspace; and carrying out a first selection from among either a coarser selection of the features or a finer selection of the features of the geometric model based on the input location and based on the determined at least one displayed characteristic of the geometric model or portion thereof, where the coarser selection includes a selection of more features of the geometric model than the finer selection, and the coarser selection includes the features of the finer selection.

A further example may include a non-transitory computer readable medium encoded with executable instructions (such as a software component on a storage device) that when executed, causes at least one processor to carry out this described method.

Another example may include an apparatus including at least one hardware, software, and/or firmware based processor, computer, controller, means, module, and/or unit configured to carry out functionality corresponding to this described method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
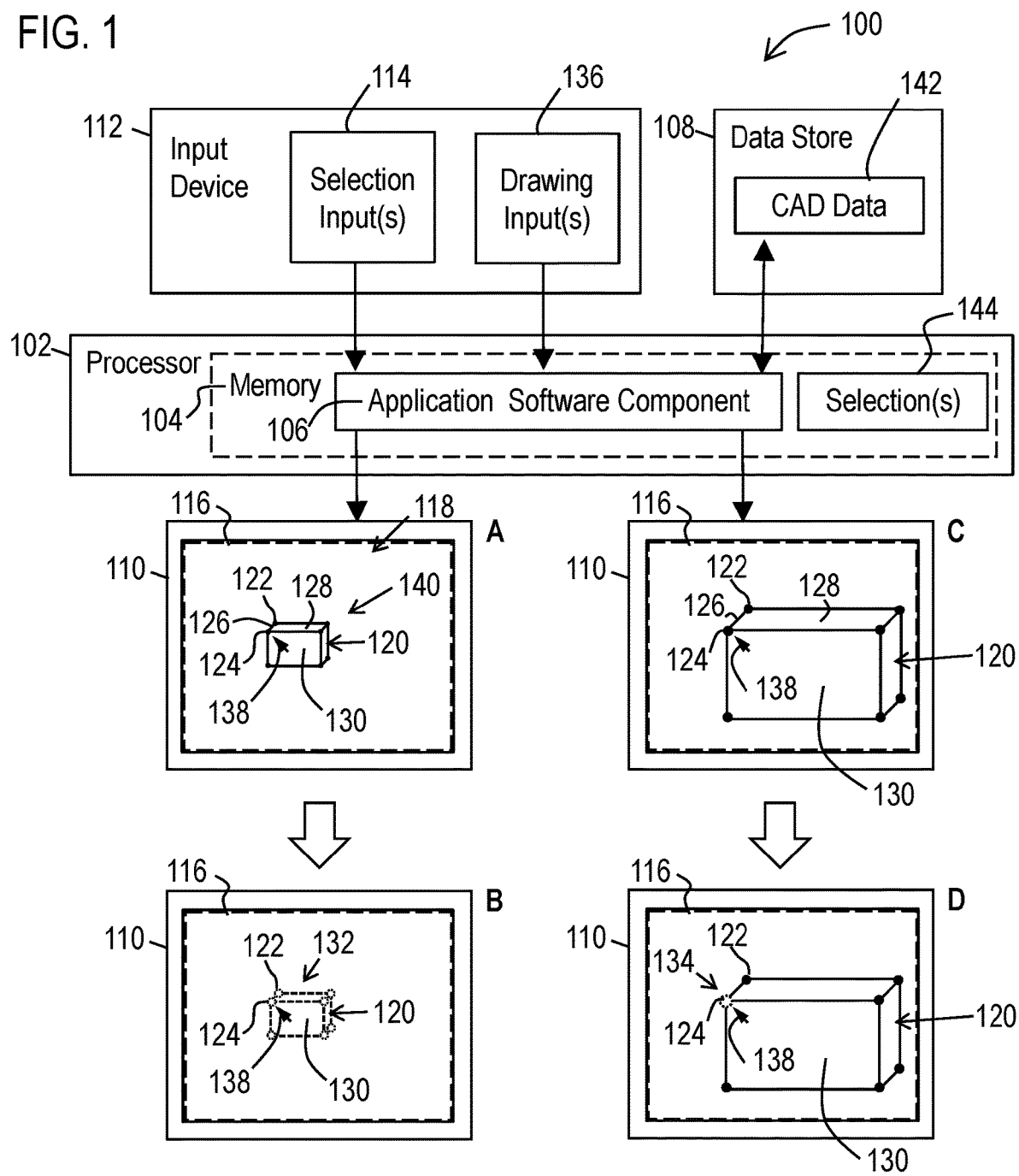
FIG. 1 illustrates a functional block diagram of an example system that facilitates perception-based selection of features in a geometric model of a part.

Various technologies that pertain to systems and methods that facilitate perception-based selection of features in a geometric model of a part will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

With reference to FIG. 1, an example data processing system 100 is illustrated that facilitates a perception-based selection of features in a geometric model of a part. The system 100 may include at least one processor 102 that is configured to execute at least one application software component 106 from a memory 104 accessed by the processor. The application software component may be configured (i.e., programmed) to cause the processor to carry out various acts and functions described herein. For example, the described application software component 106 may include and/or correspond to one or more components of a PLM software application that is configured to retrieve, generate, and store product data in a data store 108 such as a database (e.g., Oracle, Microsoft SQL Server), hard drive, SSD, memory card or other type of device that stores non-volatile data.

Examples of PLM software applications that may be adapted to carry out the features and functions described herein may include computer-aided design (CAD) software, computer-aided manufacturing (CAM) software, and computer-aided engineering (CAE) software, included in the NX suite of applications and Solid Edge software produced by Siemens Product Lifecycle Management Software Inc., of Plano, Tex., US. However, it should be appreciated that the systems and methods described herein may be used in other product systems (e.g., CAD software as well as other types of drawing software) and/or any other type of system that generates and stores product data in a database or that manipulates geometric models in a workspace The described system may include at least one display device 110 (such as a display screen) and at least one input device 112. For example, the processor may be included as part of a PC, notebook computer, workstation, server, tablet, mobile phone, or any other type of computing system. The display device, for example, may include an LCD display, monitor, and/or a projector. The input devices, for example, may include a mouse, pointer, touch screen, touch pad, drawing tablet, track ball, buttons, keypad, keyboard, game controller, camera, motion sensing device that captures motion gestures, or any other type of input device capable of providing the inputs described herein. Also, for devices such as a tablet, the processor 102 may be integrated into a housing that includes a touch screen that serves as both an input and display device. Further, it should be appreciated that some input devices (such as a game controller) may include a plurality of different types of input devices (analog stick, d-pad, and buttons).

FIG. 1 schematically illustrates a plurality of different views (A-C) of the display device 110 that are caused to be displayed by the processor 102 in response to various inputs received through the input device 112. For example, in view A of the display device 110, the processor 102 may be configured (e.g., via the application software component) to cause the display device 110 to display a graphical representation 140 of a geometric model 120 of a part (i.e., a structure) in a workspace 116 of a graphical user interface (GUI) 118.

The workspace 116 may correspond to a visual space in which features of the geometric model are visually drawn, displayed, and manipulated using the GUI 118 of the application software component 106 in order to create and/or revise the at least one geometric model 120 of a part. In example embodiments the display device 110 may correspond to a two dimensional (2D) display screen, through which different views of geometric model 120 may be viewed. Also in other examples, three dimensional (3D) displays may be used to display geometric models.

The geometric model 120 may correspond to a 2D or 3D model of the part. Such a geometric model may be comprised of a plurality of visible features that form the shape of the part. For example, such features may include straight or curved lines which are connected together at points 122, 124 to form edges 126 of a faces 128 of a plurality of different surfaces that define the shape of the geometric model 120 of the part.

The described application software component 106 may enable geometric models to be drawn and/or edited in the workspace 116 responsive to drawing inputs 136 received through the input device 112. Data representative of the drawn features of a geometric model may be stored in the memory 104 and may be saved to one or more data stores 108 in the form of CAD data 142 or any other format of data. Also, it should also be appreciated that a geometric model 120 may be retrieved from a CAD data file and/or a data store via inputs through the input device 112 and the processor may be configured to display the features of the geometric model on the display device 110 responsive to the retrieved CAD data. Such CAD data may correspond, for example, to a CAD file in a format such as JT or STEP for storing geometric curves that define the shape of the geometric model of the part.

The GUI may enable each of these features of the geometric model to be individually selectable and selectable as a set via receipt of a selection input 114 from the input device 112 that corresponds to a command to select one or more features of the geometric model. Such a selection input specifies an input location 138 (e.g., an X,Y coordinate or 3D pick ray) on the workspace that coincides with a location on or adjacent to the geometric model (such as on a point, edge, face, or other feature). However, as will be explained in more detail below, the particular feature that coincides with the input location may or may not be one of the features that is selected in response to the selection input 114.

The application software component may be configured to store data 144 representative of the selected features in the memory 104 and may cause selected features to be visually highlighted on the geometric model displayed by the GUI (e.g., via different colors, styles, and sizes). In example embodiments, such a selection input 114 may correspond to a mouse click, touch screen input, or any other type of input that specifies an input location 138 on the workspace that coincides with a location on the geometric model. Based at least in part on the input location of the selection input, the processor may be configured to cause one or more features of the geometric model to be selected. In the examples shown in the drawings, non-selected features of the geometric model 120 are shown in solid lines, whereas selected features of the geometric model 120 are shown in broken lines.

The GUI may enable the one or more selected features to be manipulated in one or more different ways (via drawing inputs 136 through the input device), such as being edited, annotated, analyzed, moved, dragged, resized, rotated, transformed, deleted, constrained, copied, modified, configured, and/or any other manipulation capable of being carried out on one or more features of the geometric model by the GUI.

In an example embodiment, the particular features that are selected for a given selection input 114 may be based on both the input location and a particular displayed characteristic of the geometric model 120 or a portion thereof in the workspace. In general, for selection inputs 114 coinciding with the same location of the geometric model, depending on the current displayed characteristic of the geometric model or portion thereof, the processor may select either a coarser selection or a finer selection of features. Such a coarser selection includes a selection of more features of the geometric model than the finer selection. The coarser selection also includes the features of the finer selection. Further, the coarser selection may include the feature coincident with the input location. However, as will be described in more detail below, the finer selection may not include the feature that is coincident with the input location.

Figure 2:
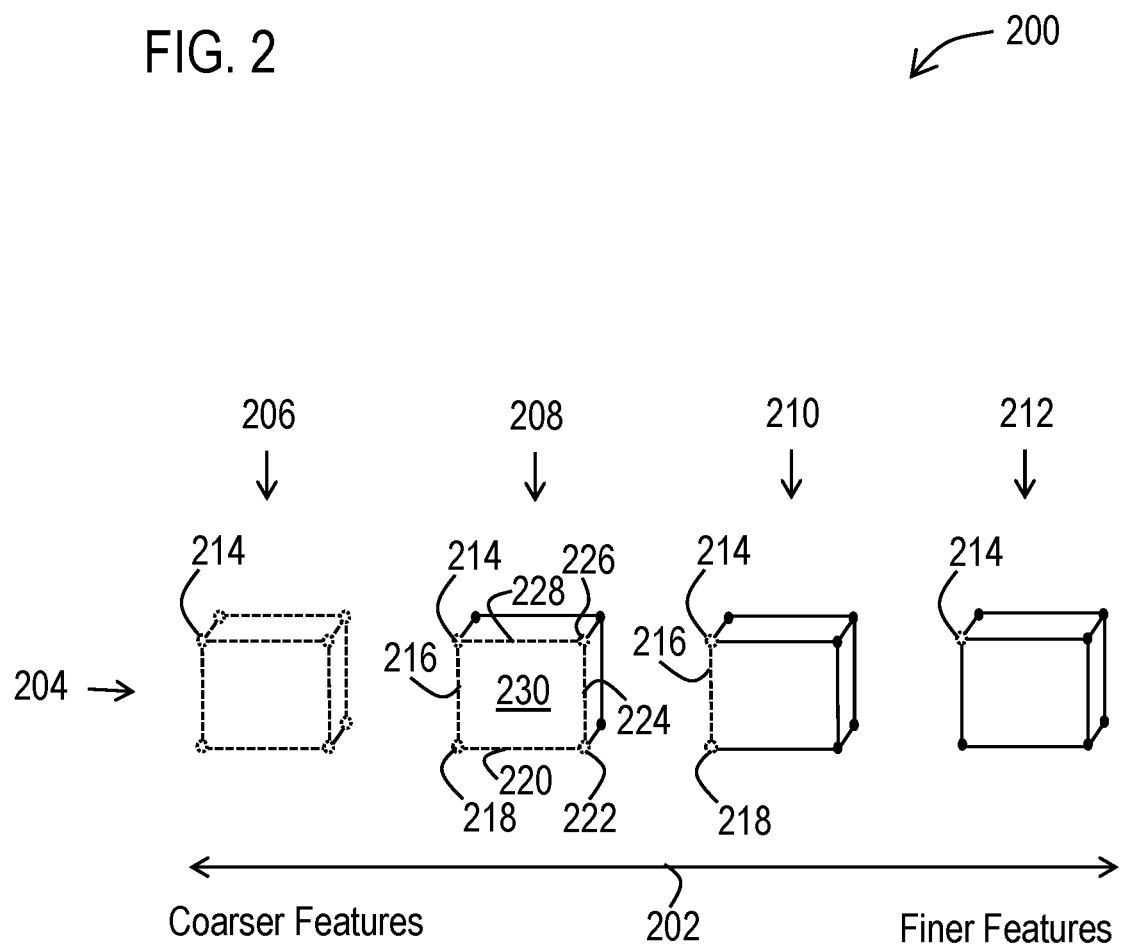
FIG. 2 illustrates coarser and finer selections of features within an object.

For example, with reference to FIG. 2, an example 200 of a graphic coarseness/fineness range 202 is illustrated that depicts different selections 206, 208, 210, 212 of features for the same object 204 (e.g., a cube). In this example, the farther to the left along this range, the coarser is the selection. Whereas the farther to the right along this range, the finer the selection. For example, selection 212 depicts the selection of a single feature of a point 214 of a geometric model of a cube (e.g. such as an end point or midpoint of a line). Selection 212 is the finest selection in this example.

Moving towards the left, the next selection 210 depicts the selection of an edge 216 of the geometric model. Such an edge selection includes the selection of multiple features including a line and two bounding points 214, 218 that define the edge. A selection of an edge feature is thus a coarser selection than the selection of a point feature.

Moving further towards the left, the next selection 208 depicts the selection of a face 230 of the geometric model. Such a face selection includes the selection of a larger number of features than the previous selection including several edges 216, 220, 224, 228, and the points 214, 218, 222, 226 that connect the edges. A selection of a face feature is thus a coarser selection than the selection of an edge feature or a point feature.

Moving to the leftmost selection, selection 206 depicts the selection of all of the selectable features of the geometric model of the part in this example (e.g., all of the selectable features for the points, edges, and faces of the geometric model). A selection of the whole graphical model of a part is thus a coarser selection than the selection of a face feature, an edge feature, or a point feature.

It should be appreciated that the coarser selections include a selection of more features of the geometric model than the relatively finer selections. Also, the coarser selections include the features of the relatively finer selections. As used herein a selectable coarser feature corresponds to a feature that includes two or more relatively finer selectable features.

When selecting features with an input device (such as a mouse) an input location for a selection input may specify a location on the geometric model that coincides with a single selectable feature (such as a point) (e.g., the mouse pointer tip is on the point when a mouse button is clicked). In such cases, the processor may be configured to select the particular single feature that coincides with the input location. However, in other examples, the input location may coincide with a coarser feature (such as an edge or face of the geometric model) that has a shape defined by other finer features (such as points for an edge, or points and edges for a face) that are near but not coincident with the input location. In such cases, the processor may be configured to make either a finer selection (such as a selection of a finer feature that is relatively closer to the input location than other finer features) or a coarser selection (including the coarser feature that coincides with the input location) based on the determined visible displayed characteristic of the geometric model or portion thereof.

For example, with respect to FIG. 1, responsive to receipt of a selection input 114, the processor may be configured to determine at least one displayed characteristic that the geometric model or portion thereof in the workspace is currently capable of being visually perceived by a user. Such a displayed characteristic may correspond to at least one of a displayed orientation (e.g., angle, rotation), a displayed position, a displayed size, or a combination thereof with respect to the workspace. The processor may then be configured to carrying out a first selection from among either a coarser selection 132 of the features or a finer selection 134 of the features of the geometric model based on the input location and based on the determined at least one displayed characteristic of the geometric model or portion thereof (e.g., the sub-feature that is coincident with the input location).

Figure 3:
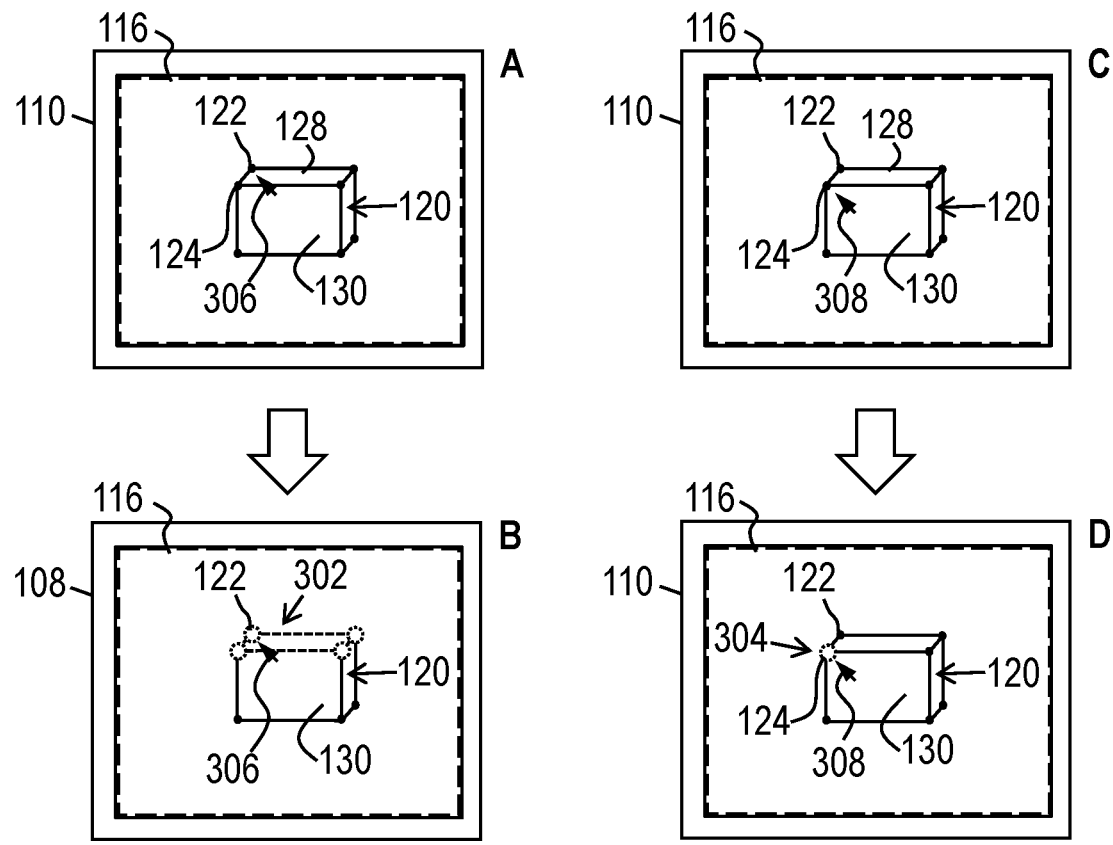
FIG. 3 illustrates the selection of features based on the displayed orientation of a portion of the geometric model in the workspace.
Figure 4:
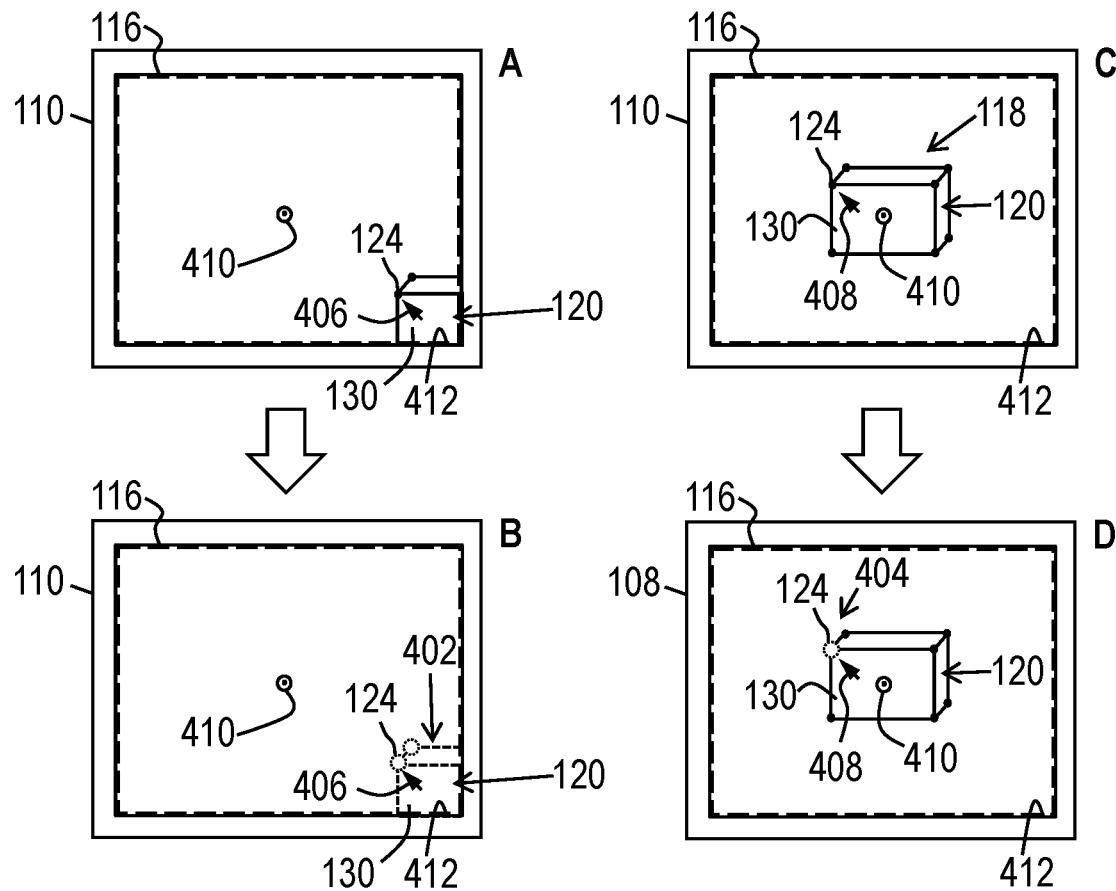
FIG. 4 illustrates the selection of features based on the position of the geometric model in the workspace.
Figure 5:
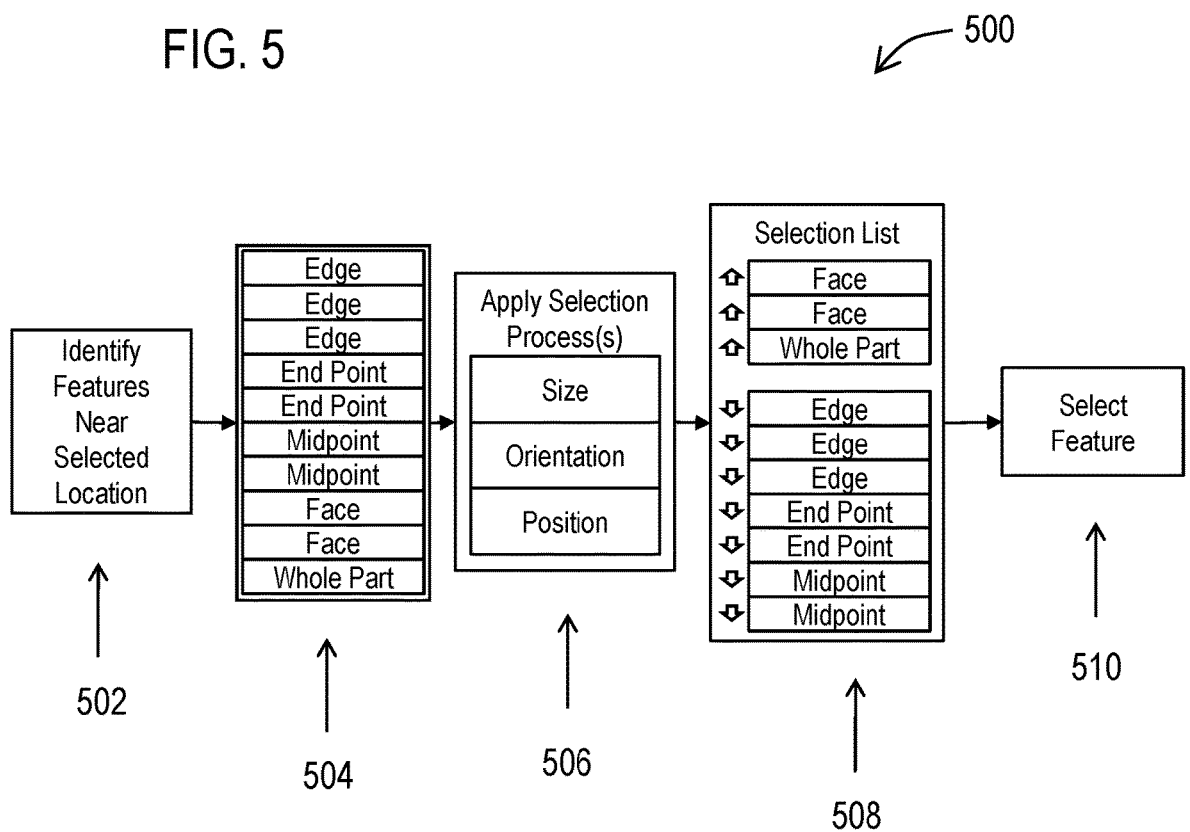
FIG. 5 illustrates an example in which a list of selectable features are displayed in an order based on the displayed characteristic of the geometric model or a portion thereof.

FIGS. 1, 3, and 4 illustrate different examples of different types of displayed characteristics that impact the selection of features. In particular, FIG. 1 illustrates in views A/B and views C/D of a display 110, first and second respective displayed characteristics corresponding to at least one of different sizes of the geometric model in the workspace 116. Also, FIG. 3 illustrates in views A/B and views C/D of a display 110, first and second respective displayed characteristics corresponding to different displayed orientations of the geometric model in the workspace 116. In addition, FIG. 5 illustrates in views A/B and views C/D of a display 110, first and second respective displayed characteristics corresponding to different positions of the geometric model in the workspace 116. In an example embodiment, the at least one processor may be configured to determine whether a current displayed characteristic of the geometric model correspond to either the first displayed characteristic (in views A/B) or the second displayed characteristic (in views C/D) based on a comparison of the current displayed characteristic of the geometric model to at least one predetermined threshold.

For example, FIG. 1 depicts different selections 132, 134 based on a displayed size corresponding to a size of the geometric model 120 with respect to the size of the workspace 116. In particular, views A and B illustrate a selection based on the selection input 114 (e.g., a mouse click input) specifying an input location 138 (X,Y coordinate of the mouse pointer) on the face 130 of the geometric model, when the geometric model and/or face 130 is relatively small compared to the size of the workspace 116. Whereas views C and D illustrate a selection based on the same selection input 114 and input location 138 on the face 130, when the geometric model is relatively larger compared to the size of the workspace 116 (i.e., larger than in views A and B). In this example the geometric model 120 corresponds to a 3D block that includes several points 122, 124, edges 126 and faces 128, 130. However, it should be appreciated that these objects are intended to generically illustrate selectable features of a geometric model, and other geometric models applicable to the described embodiments, may depict any type of shape and may include alternative and/or additional selectable features.

As illustrated in FIG. 1, when the geometric model 120 of the part has a first (e.g., smaller) displayed size with respect to the workspace 116, the processor 102 may be configured to carry out the coarser selection 132 (e.g., selection of a coarser feature coinciding with the input location 138 such as the entire geometric model and/or the face 130 thereof). However, when the geometric model 120 has a second (e.g., larger) displayed size with respect to the workspace 116, the processor may be configured to carry out the finer selection 134 (e.g., selection of the closest adjacent finer feature of a point 122 or an edge with respect to the input location 138).

In this example, the at least one predetermined threshold may correspond to a predetermined size threshold that is compared to an amount of workspace that is filled by the geometric model as a whole or by the particular feature (e.g., face 130) that is coincident with the input location 138. Such a size threshold may correspond, for example, to 10% of the area of the workspace 116, or a number of displayed pixels (or other threshold that may be configurable via the GUI). Thus, views A/B of FIG. 1 depict a coarser selection based on the geometric model 120 and/or face 130, having a determined size that fills less than 10% of the area the workspace 116 (or has an actual or estimated pixel size smaller than 100×100 pixels), whereas views A/B of FIG. 1 depict a finer selection based on the geometric model 120 and/or face 130 having a determined size that fills more than 10% of the area of the workspace 116 (or has an actual or estimated pixel size greater than 100×100 pixels).

When the size threshold corresponds to a number of pixels, the size of the object for example may be determined by calculating the actual number of pixels used to render the feature on the display screen or may correspond to estimated of the number of pixels used to render the feature by calculating the number of pixels for the area of the display screen covered by a bounding sphere or bounding box around the feature.

When making a selection, a user may desire to select the feature that is closer to the selected location. However, when the display area covered by the part decreases, the number of features that appear close to the selected location increases (e.g., see how points 122, 124 in FIG. 1 are closer to the input location 138 in views A/B compared to those in views C/D). At the small size in Views A/B, the user likely expects to select coarser features such as the entire part or the face 130 instead of detailed sub-part features of the face. Thus, the described embodiment enables the processor to make a selection based on how the user perceives the features. As a result, the described system 100 selects features that are more relevant to the user based on how the user should be able to see the features that are displayed through the display device.

In this described example, the system may calculate the area of the workspace that a feature occupies and compare this to the area of the workspace in order to determine which selections to make based on what the user likely intends. Thus as illustrated in FIG. 1, when a feature such as the whole geometric model of the part or the face 130 occupies only a small set of pixels on a workspace (comprised of thousands of pixels), the user likely intends to select the whole geometric model or a face thereof, instead of a finer feature of a point or edge.

As discussed previously, example embodiments may use a predetermined threshold configured via the GUI to distinguish between making a coarser selection or a finer selection. In some embodiments, the processor may carry out machine learning to determine this threshold based on whether a selection is acceptable or not to a user. For example, if a selection of a coarser selection is manually replaced with another finer selection by the user, the processor may be configured to automatically update the predetermined threshold (in memory and/or a data store) to have a lower level (e.g., a lower % area of the workspace that triggers a coarser selection). Conversely, if a selection of a finer selection is manually replaced with another coarser selection by the user, the processor may be configured to automatically update the predetermined threshold to have a higher level (e.g., a higher % area of the workspace that triggers a coarser selection). Such a change to the threshold may be made incrementally (e.g., via 1-2%) and/or based on a ratio between the current area size of geometric model or portion thereof and workspace area size.

In another example 300, FIG. 3 depicts different selections 302, 304 based on displayed orientations corresponding respectively to the angles of the respective faces 128, 130 of the geometric model 120 with respect to the plane of the workspace 116. In particular, views A and B illustrate a selection based on a selection input (e.g., a mouse click input) specifying an input location 306 (X,Y coordinate of the mouse pointer) on the upper face 128 of the geometric model 120, where the upper face 128 is orientated at a obtuse angle (more than 90 degrees and less that 180 degrees) with respect to the plane of the workspace 116. Whereas views C and D illustrate a selection based on a different selection input at input location 308, on the front face 130 of the geometric model 120, where the front face 130 is orientated parallel to the plane of the workspace 116.

As illustrated in FIG. 3, when the input location coincides with a face 128 that has a steep angle (such as an obtuse angle) with respect to the plane of the workspace, the processor 102 may be configured to carry out the coarser selection 302 (e.g., selection of the face 128 of the geometric model coinciding with the input location 306). However, when the input location 308 coincides with a face 130 that is parallel or has a relatively less steep angle (such as an acute angle) with respect to the plane of the workspace, the processor may be configured to carry out the finer selection 304 (e.g., selection of the closest adjacent single feature of a point 124 that defines the shape of up the face 130 with respect to the input location 308).

In this example, the system is configured to calculate the orientation (e.g., angle of rotation) of some features (such as a face) to the viewer (e.g., with respect to the plane of the workspace). Users likely intend to select detailed features on the portions of the part directly facing them. However, if a user selects a location of geometric model facing at a steep angle, the user can expect to select coarser features like the particular face that coincides with the input location.

In this example, the previously described predetermined threshold may correspond to an orientation threshold that is compared to the displayed orientation of a feature. The processor may be configured to determine that the portion of the geometric model 120 (e.g., face 128) at the input location 306 has a displayed orientation that triggers a coarser selection 302 (e.g., of the face 128 itself) based on a current displayed orientation of the face relative to the plane of the workspace being above the orientation threshold (e.g., above 90 degrees). Conversely, the processor may be configured to determine that the portion of the geometric model 120 (e.g., face 130) at the input location 308 has a displayed orientation that triggers a finer selection 304 (e.g., of the point 124 or an edge that is closer to the input location 308 than other finer features) based on a current displayed orientation of the face 130 relative to the plane of the workspace 116 being below the orientation threshold (e.g., below 90 degrees).

Example embodiments may use a predetermined orientation threshold configured via the GUI to distinguish between making a coarser selection or a finer selection based on a displayed orientation of a portion of geometric model. Also, as discussed previously, in some embodiments the processor may carry out machine learning to determine this displayed orientation threshold based on whether a selection is acceptable or not to a user and may adjust/tune the threshold accordingly.

In another example 400, FIG. 4 depicts different selections 402, 404 based on a displayed positions corresponding respectively to whether a selected geometric model 120 or portion thereof is closer to the center 410 of the workspace 116 or is close to a perimeter 412 of the workspace. In particular, views A and B illustrate a selection 402 based on a selection input (e.g., a mouse click input) specifying an input location 406 (X,Y coordinate of the mouse pointer) on the geometric model 120, when the no portion of the geometric model is positioned closer to the center 410 than the perimeter 412 of the workspace. Whereas views C and D illustrate a selection based on a different selection input at input location 408, on the geometric model 120, when the geometric model is positioned on the workspace such that it traverses the center 410.

As illustrated in FIG. 4, a user may intend to make more detailed selections toward the center of the screen, and prefer to select only coarser features at the perimeter of the screen. To carry this out, the processor 102 may be configured to make the coarser selection 402 (e.g., selection of the coarser feature such as the whole geometric model or a face thereof that is coincident with the input location 406) when the feature 130 (e.g., a face) coincident with the input location is adjacent to the perimeter 412 and is not adjacent the center 410 of the workspace. However, when the feature 130 of the geometric model that is coincident with the input location 408 is adjacent or coincident with the center 410 and is not adjacent to the perimeter 412 of the workspace, the processor may be configured to carry out the finer selection 404 (e.g., selection of the closest adjacent single feature such as a point 124 to the input location 408).

In this example, the predetermined threshold may include a position threshold that is compared to data that quantifies proximity of the geometric model, feature thereof, and/or input location to a center and/or perimeter of the workspace. Such a position threshold may, for example, correspond to a percentage of the distance the center of the workspace to the perimeter of the workspace (such as a halfway point or 75% or other threshold). The processor may be configured to calculate a distance from the input location to the center of the screen, and calculate therefrom an offset percentage with respect to how close the input location is to the center with respect to a distance between the center and a perimeter of the workspace. The distance between the center and the perimeter may correspond to the length of a radial line between the center and a perimeter that intersect the input location. However, in other examples other lengths approximating the distance between the center and perimeter of the workspace may be used (e.g., an average distance between the center and perimeter of the workspace). In this example, when the offset percentage is less than the position threshold (e.g. 75%), the processor may be configured to make the finer selection.

However, it should be appreciated that in alternative embodiments, other calculations and/or thresholds may be used to quantify the displayed position of a feature being selected relative to the center and perimeter of the workspace. For example, in another embodiment, the offset percentage may be calculated based on the closest distance from the feature coinciding with the input location to the center of the screen rather than the input location itself.

Example embodiments may use a predetermined position threshold configured via the GUI to distinguish between making a coarser selection or a finer selection based on a displayed input location with respect to the workspace. Also, as discussed previously in some embodiments, the processor may carry out machine learning to determine this position threshold based on whether a selection is acceptable or not to a user and may adjust/tune the threshold accordingly.

It should also be appreciated that one or more of the previously described processes for selecting between a coarser selection and a finer selection may be applicable for a particular input location. For example, as illustrated in FIG. 4, the input location in view D may intersect with a front face of the geometric model, when the geometric model is relatively large and the face intersects the center of the workspace. Thus all three of the previously described processes for determining whether to make a coarser or finer selection may apply.

Because some of these processes may conflict with each other depending on the displayed size, orientation, and position of the geometric model or portion thereof, the processor may be configured to determine which processes to use to make a selection based on a predetermined precedence ranking among the different selection processes (e.g., a coarser selection based on a displayed size selection may have a higher precedence over a finer selection based on a displayed orientation or displayed position selection). However, in other embodiments, other precedence ranking orders may be chosen. Further, such precedence rankings orders among available selection processes may be user configurable via the GUI. In addition, in some embodiments the processor may carry out machine learning to determine the precedence ranking based on whether a selection is acceptable or not to a user and may adjust/tune the precedence ranking order accordingly.

In addition, or alternatively, applicable coarser selections in general may have higher precedence than applicable finer selections. Thus, the applicable process (coarse or fine selection) can be changed simply by the user navigating around the scene to focus on different areas or parts. For example, by default, features at an input location that are small in size, near the perimeter of the workspace, and/or have a steep angle with respect to the plane of the workspace, may produce a coarser selection. However, if the user wants to select a more fine (i.e., detailed) feature, the user may zoom in on a part (increase the size of the geometric model in the workspace), rotate a face to face them (reorient the feature), and move it closer to the center of the workspace.

In the previously described examples, the processor may automatically make the coarser or finer selection in response to receipt of the selection input (without a further input from the user). However, in a further embodiment (which may be enabled via the GUI), the processor may be configured to display a ranking of selectable features in a list, which are individually selectable by the user using a second input through at least one input device. Such a list may have an order based on the previously described precedence ranking between coarser and finer selections and the described different processes for making these selections.

The system may use the described processes to determine the types of features eligible for selection in the list and/or contribute to a ranking of candidate features in the list. For example, if the geometric model of a part occupies a small part of the workspace, the processor may exclude finer features like edges and points because the user may not be able to visually resolve differences between nearby features well at this screen size. Further, in another example, the processor may prioritize coarser features like faces of the geometric model or the whole geometric model so as to appear higher in the list when the workspace area covered by the geometric model is small.

FIG. 5 illustrates an example process 500 by which such a selection list may be generated. For example, the processor may identify 502 an initial set 504 of features near an input location. Next, the processor may carry out one or more of the previously described selection processes 506, in order to generate a selection list 508 of features based on the initial set 504, in which the features are ordered (and optionally filtered) to include selections that are more likely to be selected by the user at the top of the list, and selections which are less likely to be selected at the bottom of the list. Such a selection list may be presented via the GUI such that a user may provide a further input that selects the particular feature from the selection list that the user wishes to make selected on the geometric model. Responsive to the selection of a feature from the selection list, the processor may be configured to select 510 the feature on the graphical model.

The described examples of the system are operable to select features that are more relevant to the user based on how the user likely perceives the geometric model of the part and features thereof on the workspace of the display. This enables users to make selections more efficiently by avoiding a need to take steps to manually limit features prior to selection. Thus a user may not have to decide which type of feature they plan to select prior to making the selection. The described system determines what types of features may be relevant using the perception-based selection processes. The user may not need to stop and change their selection criteria to select multiple types of features. Rather, with the described system, the user can zoom in, making the geometric model of the part larger on the display, to select more detailed features, and zoom out to select only from the coarser features. In addition, the described system may avoid or reduce the amount of manual filtering of selections.

It should also be appreciated that the system described herein may cavy out other or alternative perception-based selection processes. For example, in an alternative embodiment to the displayed size selection example (in FIG. 1), the system may make a coarser selection when a number of competing finer features are adjacent to the input location of a selection input. For example, if the start and midpoint of an edge are both adjacent to the input location of a selection input (i.e., within a proximity threshold of the input location), the processor may determine to make the coarser selection of the edge instead of a finer selection of one or both of the points on the edge. Also for example, if multiple edges of a face are adjacent to the input location of a selection input, the system may make the coarser selection of the face. This example filters out selectable features that may be too close together to distinguish based on the displayed size of the part. Also in this example, a predetermined threshold may be calculated based on aspects of the display, such as dimensions of the workspace in pixels or other parameter(s) determinable by the processor that reflects how much detail a user may perceive when viewing the geometric model.

Figure 6:
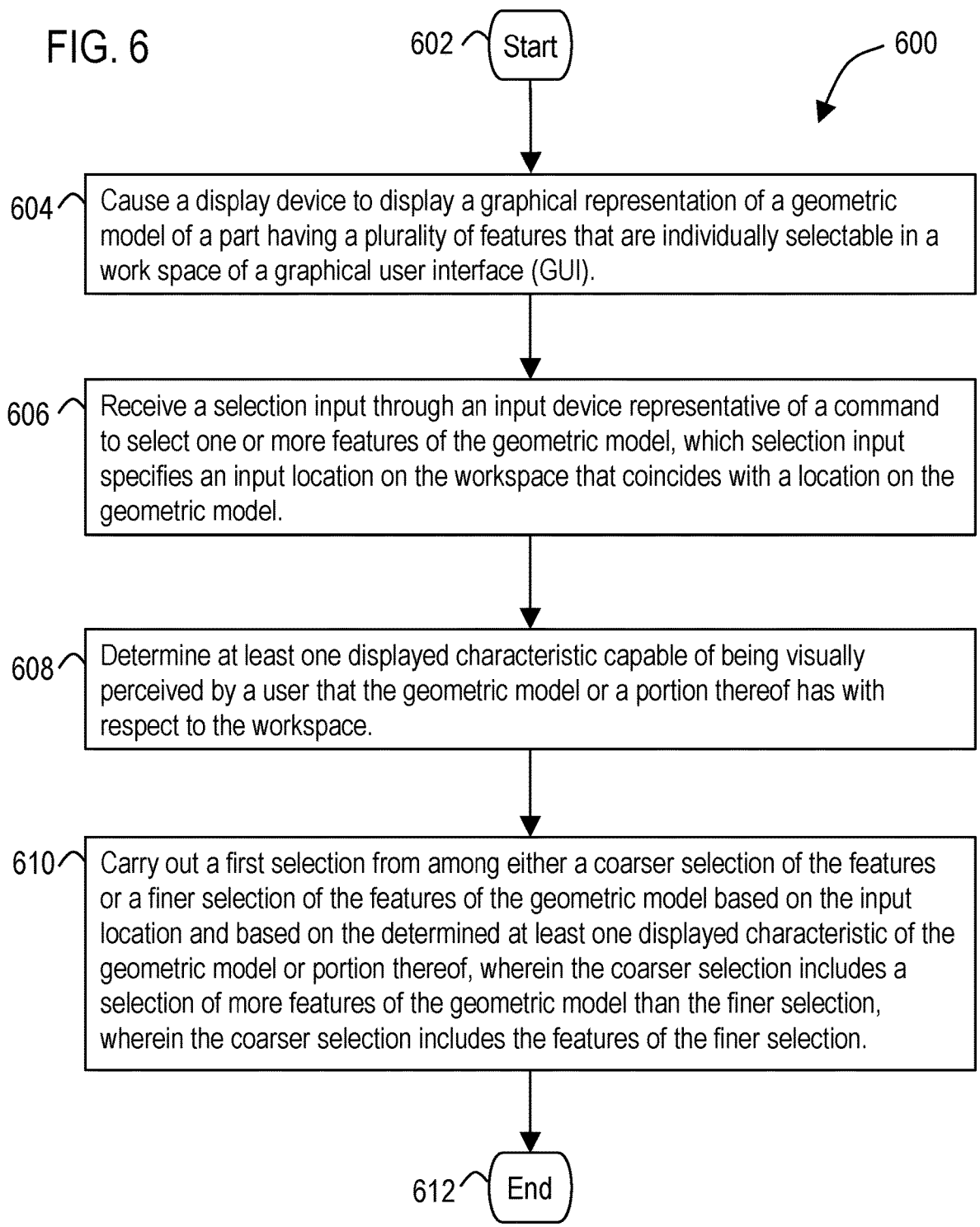
FIG. 6 illustrates a flow diagram of an example methodology that facilitates perception-based selection of features in a geometric model of a part.

With reference now to FIG. 6, various example methodologies are illustrated and described. While the methodologies are described as being a series of acts that are performed in a sequence, it is to be understood that the methodologies may not be limited by the order of the sequence. For instance, some acts may occur in a different order than what is described herein. In addition, an act may occur concurrently with another act. Furthermore, in some instances, not all acts may be required to implement a methodology described herein.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, hard disk drives, SSDs, flash memory, CDs, DVDs, and Blu-ray disks. The computer-executable instructions may include a routine, a sub-routine, programs, applications, modules, libraries, and/or the like. Still further, results of acts of the methodologies may be stored in a computer-readable medium, displayed on a display device, and/or the like.

Referring now to FIG. 6, a methodology 600 is illustrated that facilitates perception-based selection of features in a geometric model. The methodology may start at 602 and may include several acts carried out through operation of at least one processor. These acts may include an act 604 of causing a display device to display a graphical representation of a geometric model of a part having a plurality of features that are individually selectable in a work space of a graphical user interface. In addition, the methodology may include an act 606 of receiving a selection input through an input device representative of a command to select one or more features of the geometric model, which selection input specifies an input location on the workspace that coincides with a location on the geometric model. Further the methodology may include an act 608 of determining at least one displayed characteristic capable of being visually perceived by a user that the geometric model or a portion thereof has with respect to the workspace. Also, the methodology may include an act 610 of carrying out a first selection from among either a coarser selection of the features or a finer selection of the features of the geometric model based on the input location and based on the determined at least one displayed characteristic of the geometric model or portion thereof. In this example, the coarser selection includes a selection of more features of the geometric model than the finer selection. Also in this example the coarser selection includes the features of the finer selection. At 612 the methodology may end.

It should be appreciated that the methodology 600 may include other acts and features discussed previously with respect to the processing system 100. For example, when the geometric model or portion thereof has a first displayed characteristic with respect to the workspace, the processor may be configured to carry out the coarser selection. Also when the geometric model or portion thereof has a second displayed characteristic with respect to the workspace, the processor may be configured to carry out the finer selection. The first and second displayed characteristics, for example, may correspond to at least one of different sizes, different displayed orientations, different positions or any combination thereof of the geometric model or a portion thereof in the workspace. The methodology may further include determining whether a current displayed characteristic of the geometric model corresponds to either the first displayed characteristic or the second displayed characteristic based on a comparison of the current displayed characteristic of the geometric model or portion thereof to at least one predetermined threshold.

In an example embodiment of the methodology, when the input location coincides with the location on the geometric model of a coarser feature having a shape defined by two or more finer features, the coarser selection may include the two or more finer features that define the coarser feature and the finer selection may include one of the finer features that is relatively closer to the input location than other finer feature, but not include all of the two or more finer features that define the coarser feature.

In a further example, the act 610 of carrying out the first selection may include: storing data representative of the features of the first selection in the memory; and causing the graphical representation of the part to visually indicate which features of the first selection are selected. In addition the act 610 of carrying out the first selection may include either: automatically making the first selection responsive to the selection input; or causing the first selection to be carried out by causing a selection list to be displayed in the GUI, which lists a plurality of features that are selectable from the selection list via at least one input through the input device and which features in the selection list are listed in an order based on the input location and the determined at least one displayed characteristic of the geometric model or portion thereof.

In an example embodiment of the methodology, the at least one predetermined threshold may correspond to a fraction of the spatial area of the workspace displayed through the display device, or a number of displayed pixels. Also, the first and second displayed characteristics may correspond to the geometric model or portion thereof having respective different sizes in the workspace. In this example, the size of the geometric model or portion thereof in the first displayed characteristic may be smaller than the size of the geometric mode or portion thereof in the second displayed characteristic relative to the workspace.

In another example embodiment of the methodology, the at least one predetermined threshold may correspond to an orientation threshold. Also, the first and second displayed characteristics may correspond to a portion of the geometric model corresponding to a face that is coincident with the input location and which has respective first and second different displayed orientations in the workspace. In this example, the methodology may further include an act, through operation of the at least one processor of determining either that: the face has the first displayed orientation based on a current displayed orientation of the face of the geometric model relative to a plane of the workspace being above the orientation threshold; or the face has the second displayed orientation based on the current displayed orientation of the face of the geometric model relative to the plane of the workspace being below the displayed orientation threshold. Also in this example, the coarser selection may include the face of the geometric model and the features that define the shape of the face. In addition the finer selection may include at least one point or edge of the face that is relatively closer to the input location than other points or edges of the face, but not include all of the points or edges that define the shape of the face.

In a further example embodiment of the methodology, the at least one predetermined threshold corresponds to a position threshold. Also the first and second displayed characteristics may correspond to the geometric model or a portion thereof that coincides with the input location having respective first and second different positions in the workspace relative to a center and a perimeter of the workspace. In this example, the first position may correspond to at least one of the geometric model, a portion thereof coincident with the input location, the input location or a combination thereof that extends adjacent the perimeter of the workspace and does not extending adjacent the center of the workspace. Also in this example, the second position may correspond to at least one of the geometric model, a portion thereof coincident with the input location, the input location or a combination thereof that extends adjacent the center of the workspace and does not extend adjacent the perimeter of the workspace.

As discussed previously, acts associated with these methodologies (other than any described manual acts) may be carried out by one or more processors. Such processor(s) may be included in one or more data processing systems, for example, that execute software components (such as the described application software component) operative to cause these acts to be carried out by the one or more processors. In an example embodiment, such software components may comprise computer-executable instructions corresponding to a routine, a sub-routine, programs, applications, modules, libraries, a thread of execution, and/or the like. Further, it should be appreciated that software components may be written in and/or produced by software environments/languages/frameworks such as Java, JavaScript, Python, C, C#, C++ or any other software tool capable of producing components and graphical user interfaces configured to carry out the acts and features described herein.

Figure 7:
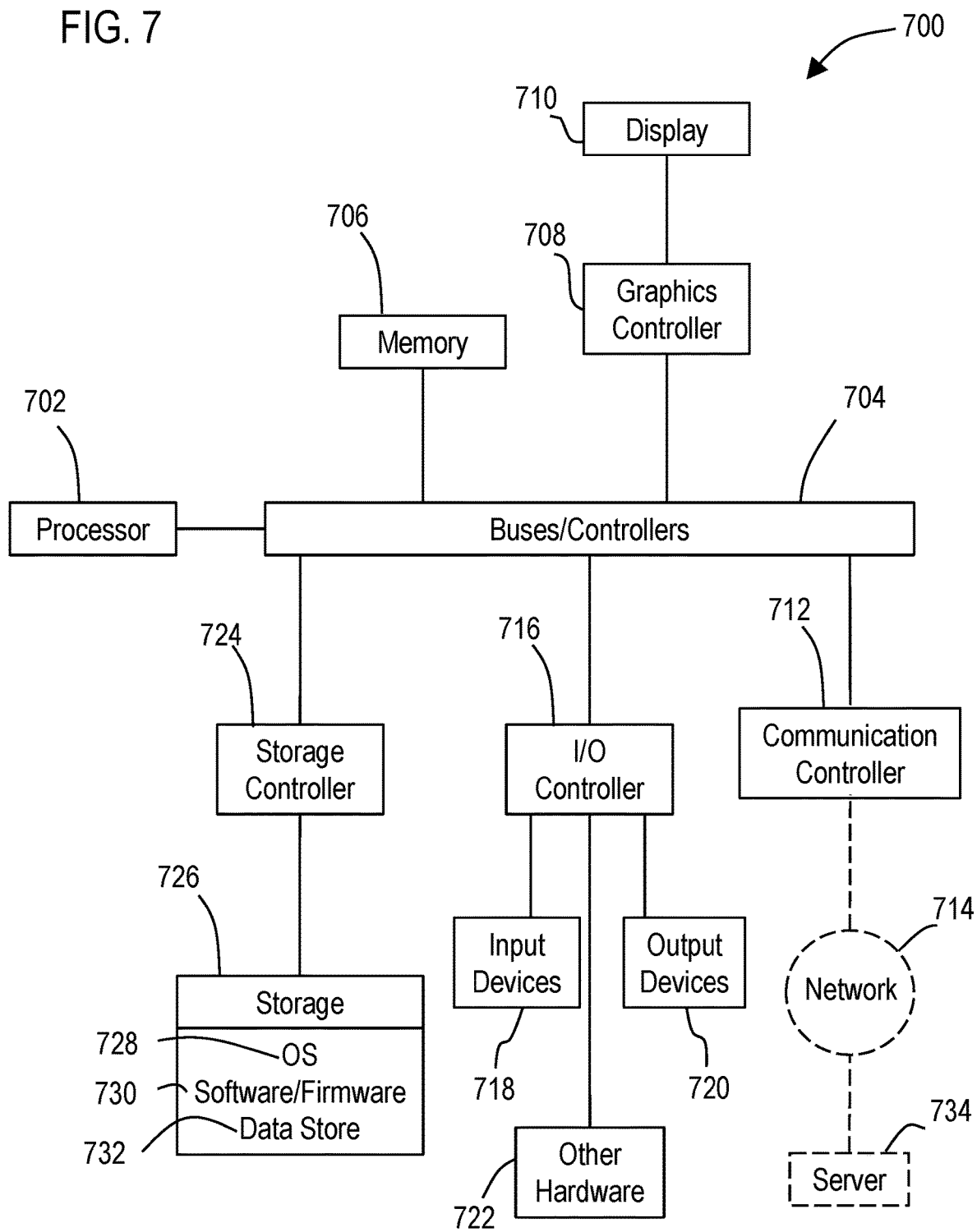
FIG. 7 illustrates a block diagram of a data processing system in which an embodiment may be implemented.

FIG. 7 illustrates a block diagram of a data processing system 700 (also referred to as a computer system) in which an embodiment can be implemented, for example, as a portion of a product system, and/or other system operatively configured by software or otherwise to perform the processes as described herein. The data processing system depicted includes at least one processor 702 (e.g., a CPU) that may be connected to one or more bridges/controllers/buses 704 (e.g., a north bridge, a south bridge). One of the buses 704, for example, may include one or more I/O buses such as a PCI Express bus. Also connected to various buses in the depicted example may include a main memory 706 (RAM) and a graphics controller 708. The graphics controller 708 may be connected to one or more display devices 710. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 712 (Ethernet controllers, WiFi controllers, cellular controllers) operative to connect to a local area network (LAN), Wide Area Network (WAN), a cellular network, and/or other wired or wireless networks 714 or communication equipment.

Further components connected to various busses may include one or more I/O controllers 716 such as USB controllers, Bluetooth controllers, and/or dedicated audio controllers (connected to speakers and/or microphones). It should also be appreciated that various peripherals may be connected to the I/O controller(s) (via various ports and connections) including input devices 718 (e.g., keyboard, mouse, pointer, touch screen, touch pad, drawing tablet, trackball, buttons, keypad, game controller, gamepad, camera, microphone, scanners, motion sensing devices that capture motion gestures), output devices 720 (e.g., printers, speakers) or any other type of device that is operative to provide inputs to or receive outputs from the data processing system. Also, it should be appreciated that many devices referred to as input devices or output devices may both provide inputs and receive outputs of communications with the data processing system. For example, the processor 702 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 722 connected to the I/O controllers 716 may include any type of device, machine, or component that is configured to communicate with a data processing system.

Additional components connected to various busses may include one or more storage controllers 724 (e.g., SATA). A storage controller may be connected to a storage device 726 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 704 such as a PCI Express bus.

A data processing system in accordance with an embodiment of the present disclosure may include an operating system 728, software/firmware 730, and data stores 732 (that may be stored on a storage device 726 and/or the memory 706). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, macOS, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 712 may be connected to the network 714 (not a part of data processing system 700), which can be any public or private data processing system network or combination of networks, as known to those of skill in the art, including the Internet. Data processing system 700 can communicate over the network 714 with one or more other data processing systems such as a server 734 (also not part of the data processing system 700). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 702 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 700 in this example may correspond to a controller, computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

Also, it should be noted that the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In another example, such a client device may correspond to a computer miming a web browser or thin client application. Inputs from the user may be transmitted from the web browser or thin client application to be evaluated on the server, rendered by the server, and an image (or series of images) sent back to the client computer to be displayed by the web browser or thin client application. Also in some examples, the remote processor described herein may correspond to a combination of a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 700 may conform to any of the various current implementations and practices known in the art.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof; may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is executing the software/firmware, which is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may also correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

In addition, the term "adjacent to" may mean: that a feature is relatively near to but not in contact with a further feature; or that the feature is in contact with the further portion, unless the context clearly indicates otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A system for perception-based selection of features in a geometric model of a part comprising:
   at least one processor configured to:
   cause a display device to display a graphical representation of a geometric model of a part having a plurality of features that are individually selectable in a work space of a graphical user interface (GUI);
   receive a selection input through an input device representative of a command to select one or more features of the geometric model, which wherein the selection input specifies an input location on the workspace that coincides with a location on the geometric model;
   determine at least one displayed characteristic capable of being visually perceived by a user that the geometric model or a portion thereof has with respect to the workspace; and
   carry out a first selection from among either a coarser selection of the features or a finer selection of the features of the geometric model based on the input location and based on the determined at least one displayed characteristic of the geometric model or portion thereof, wherein the coarser selection includes a selection of more features of the geometric model than the finer selection, wherein the coarser selection includes the features of the finer selection,
   wherein when the geometric model or portion thereof has a first displayed characteristic with respect to the workspace, the processor is configured to carry out the coarser selection,
   wherein when the geometric model or portion thereof has a second displayed characteristic with respect to the workspace, the processor is configured to carry out the finer selection,
   wherein the first and second displayed characteristics correspond to the geometric model or a portion thereof that coincides with the input location having respective first and second different positions in the workspace relative to a center and a perimeter of the workspace, wherein the at least one processor is configured to determine whether a current displayed characteristic of the geometric model corresponds to either the first displayed characteristic or the second displayed characteristic based on a comparison of the current displayed characteristic of the geometric model or portion thereof to at least one predetermined threshold, wherein the at least one predetermined threshold corresponds to a position threshold, wherein the first position corresponds to at least one of the geometric model, a portion thereof coincident with the input location, the input location or a combination thereof that extends adjacent the perimeter of the workspace and does not extend adjacent the center of the workspace, and wherein the second position corresponds to at least one of the geometric model, a portion thereof coincident with the input location, the input location or a combination thereof that extends adjacent the center of the workspace and does not extend adjacent the perimeter of the workspace.

2. The system according to claim 1, wherein when the input location coincides with the location on the geometric model of a coarser feature having a shape defined by two or more finer features, the coarser selection includes the two or more finer features that define the coarser feature and the finer selection includes one of the finer features that is relatively closer to the input location than other finer features, wherein the finer selection does not include all of the two or more finer features that define the coarser feature.

3. The system according to claim 2, further comprising a memory and an application software component executed by the at least one processor from the memory that causes the at least one processor to generate the GUI, wherein the processor is configured to store data representative of the features of the first selection in the memory and cause the graphical representation of the part to visually indicate which features of the first selection are selected, and wherein the processor is operable to either automatically make the first selection responsive to the selection input or cause the first selection to be carried out by causing a selection list to be displayed in the GUI, which lists a plurality of features that are selectable from the selection list via at least one input through the input device and which features in the selection list are listed in an order based on the input location and the determined at least one displayed characteristic of the geometric model or portion thereof.

4. The system according to claim 3, wherein the at least one predetermined threshold corresponds to a fraction of a spatial area of the workspace displayed through the display device or a number of displayed pixels, wherein the first and second displayed characteristics correspond to the geometric model or portion thereof having respective different sizes in the workspace, and wherein the size of the geometric model or portion thereof in the first displayed characteristic is smaller than the size of the geometric mode or portion thereof in the second displayed characteristic relative to the workspace.

5. The system according to claim 3, wherein the at least one predetermined threshold corresponds to an orientation threshold, wherein the first and second displayed characteristics correspond to a portion of the geometric model corresponding to a face that is coincident with the input location and which has respective first and second different displayed orientations in the workspace, wherein the processor is configured to determine that the face has the first displayed orientation based on a current displayed orientation of the face of the geometric model relative to a plane of the workspace being above the orientation threshold, wherein the processor is configured to determine that the face has the second displayed orientation based on the current displayed orientation of the face of the geometric model relative to the plane of the workspace being below the orientation threshold, wherein the coarser selection includes the face of the geometric model and the features that define the shape of the face, wherein the finer selection includes at least one point or edge of the face that is relatively closer to the input location than other points or edges of the face, and wherein the finer selection does not include all of the points or edges that define the shape of the face.

6. A method for perception-based selection of features in a geometric model of a part comprising:

through operation of at least one processor:

causing a display device to display a graphical representation of a geometric model of a part having a plurality of features that are individually selectable in a work space of a graphical user interface (GUI);

receiving a selection input through an input device representative of a command to select one or more features of the geometric model, which selection input specifies an input location on the workspace that coincides with a location on the geometric model;

determining at least one displayed characteristic capable of being visually perceived by a user that the geometric model or a portion thereof has with respect to the workspace; and carrying out a first selection from among either a coarser selection of the features or a finer selection of the features of the geometric model based on the input location and based on the determined at least one displayed characteristic of the geometric model or portion thereof, wherein the coarser selection includes a selection of more features of the geometric model than the finer selection, wherein the coarser selection includes the features of the finer selection, and comprising carrying out the coarser selection when the geometric model or portion thereof has a first displayed characteristic with respect to the workspace, comprising carrying out the finer selection when the geometric model or portion thereof has a second displayed characteristic with respect to the workspace, wherein the first and second displayed characteristics correspond to the geometric model or a portion thereof that coincides with the input location having respective first and second different positions in the workspace relative to a center and a perimeter of the workspace, further comprising, through operation of the at least one processor, determining whether a current displayed characteristic of the geometric model corresponds to either the first displayed characteristic or the second displayed characteristic based on a comparison of the current displayed characteristic of the geometric model or portion thereof to at least one predetermined threshold, and wherein the at least one predetermined threshold corresponds to a position threshold, wherein the first position corresponds to at least one of the geometric model, a portion thereof coincident with the input location, the input location or a combination thereof that extends adjacent the perimeter of the workspace and does not extend adjacent the center of the workspace, and wherein the second position corresponds to at least one of the geometric model, a portion thereof coincident with the input location, the input location or a combination thereof that extends adjacent the center of the workspace and does not extend adjacent the perimeter of the workspace.

7. The method according to claim 6, wherein when the input location coincides with the location on the geometric model of a coarser feature having a shape defined by two or more finer features, the coarser selection includes the two or more finer features that define the coarser feature and the finer selection includes one of the finer features that is relatively closer to the input location than other finer features, wherein the finer selection does not include all of the two or more finer features that define the coarser feature.

8. The method according to claim 7, further comprising through operation of the at least one processor:

wherein carrying out the first selection includes:
storing data representative of the features of the first selection in the memory; and
causing the graphical representation of the part to visually indicate which features of the first selection are selected, wherein carrying out the first selection includes either:
automatically making the first selection responsive to the selection input; or
causing the first selection to be carried out by causing a selection list to be displayed in the GUI, which lists a plurality of features that are selectable from the selection list via at least one input through the input device and which features in the selection list are listed in an order based on the input location and the determined at least one displayed characteristic of the geometric model or portion thereof.

9. The method according to claim 8, wherein the at least one predetermined threshold corresponds to a fraction of a spatial area of the workspace displayed through the display device or a number of displayed pixels, wherein the first and second displayed characteristics correspond to the geometric model or portion thereof having respective different sizes in the workspace, and wherein the size of the geometric model or portion thereof in the first displayed characteristic is smaller than the size of the geometric mode or portion thereof in the second displayed characteristic relative to the workspace.

10. The method according to claim 8, wherein the at least one predetermined threshold corresponds to an orientation threshold, wherein the first and second displayed characteristics correspond to a portion of the geometric model corresponding to a face that is coincident with the input location and which has respective first and second different displayed orientations in the workspace, and further comprising, through operation of the at least one processor, determining either that:
the face has the first displayed orientation based on a current displayed orientation of the face of the geometric model relative to a plane of the workspace being above the orientation threshold; or
the face has the second displayed orientation based on the current displayed orientation of the face of the geometric model relative to the plane of the workspace being below the orientation threshold, and wherein the coarser selection includes the face of the geometric model and the features that define the shape of the face, wherein the finer selection includes at least one point or edge of the face that is relatively closer to the input location than other points or edges of the face, and wherein the finer selection does not include all of the points or edges that define the shape of the face.

11. A non-transitory computer readable medium encoded with executable instructions that when executed, cause at least one processor to:

cause a display device to display a graphical representation of a geometric model of a part having a plurality of features that are individually selectable in a work space of a graphical user interface (GUI);

receive a selection input through an input device representative of a command to select one or more features of the geometric model, which wherein the selection input specifies an input location on the workspace that coincides with a location on the geometric model;

determine at least one displayed characteristic capable of being visually perceived by a user that the geometric model or a portion thereof has with respect to the workspace; and carry out a first selection from among either a coarser selection of the features or a finer selection of the features of the geometric model based on the input location and based on the determined at least one displayed characteristic of the geometric model or portion thereof, wherein the coarser selection includes a selection of more features of the geometric model than the finer selection, wherein the coarser selection includes the features of the finer selection, and wherein the executable instructions, when executed, cause the at least one processor to:
carry out the coarser selection when the geometric model or portion thereof has a first displayed characteristic with respect to the workspace, and
carry out the finer selection when the geometric model or portion thereof has a second displayed characteristic with respect to the workspace, wherein the first and second displayed characteristics correspond to the geometric model or a portion thereof that coincides with the input location having respective first and second different positions in the workspace relative to a center and a perimeter of the workspace, wherein the executable instructions, when executed, further cause the at least one processor to determine whether a current displayed characteristic of the geometric model corresponds to either the first displayed characteristic or the second displayed characteristic based on a comparison of the current displayed characteristic of the geometric model or portion thereof to at least one predetermined threshold, and
wherein the at least one predetermined threshold corresponds to a position threshold,
wherein the first position corresponds to at least one of the geometric model, a portion thereof coincident with the input location, the input location or a combination thereof that extends adjacent the perimeter of the workspace and does not extend adjacent the center of the workspace, and
wherein the second position corresponds to at least one of the geometric model, a portion thereof coincident with the input location, the input location or a combination thereof that extends adjacent the center of the workspace and does not extend adjacent the perimeter of the workspace.

12. The non-transitory computer-readable medium of claim 11, wherein when the input location coincides with the location on the geometric model of a coarser feature having a shape defined by two or more finer features, the coarser selection includes the two or more finer features that define the coarser feature and the finer selection includes one of the finer features that is relatively closer to the input location than other finer features, wherein the finer selection does not include all of the two or more finer features that define the coarser feature.

13. The non-transitory computer-readable medium of claim 12, wherein the executable instructions, when executed, further cause the at least one processor to:
store data representative of the features of the first selection in a memory and cause the graphical representation of the part to visually indicate which features of the first selection are selected, and
either automatically make the first selection responsive to the selection input or cause the first selection to be carried out by causing a selection list to be displayed in the GUI, which lists a plurality of features that are selectable from the selection list via at least one input through the input device and which features in the selection list are listed in an order based on the input location and the determined at least one displayed characteristic of the geometric model or portion thereof.

14. The non-transitory computer-readable medium of claim 13, wherein the at least one predetermined threshold corresponds to a fraction of a spatial area of the workspace displayed through the display device or a number of displayed pixels,
wherein the first and second displayed characteristics correspond to the geometric model or portion thereof having respective different sizes in the workspace, and
wherein the size of the geometric model or portion thereof in the first displayed characteristic is smaller than the size of the geometric mode or portion thereof in the second displayed characteristic relative to the workspace.

15. The non-transitory computer-readable medium of claim 13, wherein the at least one predetermined threshold corresponds to an orientation threshold,
wherein the first and second displayed characteristics correspond to a portion of the geometric model corresponding to a face that is coincident with the input location and which has respective first and second different displayed orientations in the workspace,
wherein the executable instructions, when executed, cause the at least one processor to determine that the face has the first displayed orientation based on a current displayed orientation of the face of the geometric model relative to a plane of the workspace being above the orientation threshold,
wherein the executable instructions, when executed, cause the at least one processor to determine that the face has the second displayed orientation based on the current displayed orientation of the face of the geometric model relative to the plane of the workspace being below the orientation threshold,
wherein the coarser selection includes the face of the geometric model and the features that define the shape of the face,
wherein the finer selection includes at least one point or edge of the face that is relatively closer to the input location than other points or edges of the face, and
wherein the finer selection does not include all of the points or edges that define the shape of the face.

* * * * *